United States Patent [19]

Sasaki et al.

[11] 3,846,700
[45] Nov. 5, 1974

[54] ELECTROSTATIC FIELD MEASURING APPARATUS

[75] Inventors: Hiroshi Sasaki, Tokorozawa; Toshihiko Ohno, Higashimurayama, both of Japan

[73] Assignee: Rion Co., Ltd., Tokyo, Japan

[22] Filed: Feb. 28, 1973

[21] Appl. No.: 336,499

[30] Foreign Application Priority Data
May 31, 1972 Japan.................................. 47-54472

[52] U.S. Cl. ............................................... 324/72
[51] Int. Cl. ........................................... G01r 31/02
[58] Field of Search.............................. 324/32, 72

[56] References Cited
UNITED STATES PATENTS

| | | | |
|---|---|---|---|
| 2,454,630 | 11/1948 | Buckthal | 324/72 |
| 2,815,483 | 12/1957 | Kaufman | 324/72 |
| 3,344,344 | 9/1967 | Wales | 324/32 |
| 3,611,127 | 10/1971 | Vosteen | 324/72 |
| 3,667,036 | 5/1972 | Seachman | 324/72 |

*Primary Examiner*—Alfred E. Smith
*Assistant Examiner*—Rolf Hille
*Attorney, Agent, or Firm*—Wolfe, Hubbard, Leydig, Voit & Osann, Ltd.

[57] ABSTRACT

An improved all-weather type apparatus for measuring electrostatic field in the air wherein sensed electrostatic field is AC amplified by a high impedance amplifier. A sensing electrode connected to the input end of an amplifier and periodically exposed to the field is supported by an insulative member mounted on a conductive surface or return. A feedback electrode connected to a positive feedback connection on the amplifier is provided on the insulative member between the sensing electrode and the return. Thus, any surface leakage current flowing from the sensing electrode to the return due to moisture or surface conductions will be neutralized so that accurate measurements will be obtained regardless of moisture of other conductive deposit on the insulator.

7 Claims, 10 Drawing Figures

PRIOR ART AMPLIFIER

ELECTROSTATIC FIELD MEASURING APPARATUS

This invention relates to an improvement in apparatuses for measuring electrostatic field and, more particularly, to an improvement in detector means to be used in the apparatus referred to of the type that the output of sensing electrode due to the electrostatic field is AC amplified.

Generally there have been known electrostatic field measuring apparatuses of a system wherein a detector provided with a sensing electrode is placed in an electric field to be measured so that an electric charge due to an electrostatic induction will be amplified and detected. Such apparatuses are largely classifiable into those of direct current amplifying type and of alternating current amplifying type. In the apparatuses of the alternating current amplifying type, the variation of the sensitivity resulting from the leakage of the electric charge through the electrode supporter consisting of an insulator from the sensing electrode in the measuring apparatus is less as compared with those of the direct current amplifying type, and thus the AC amplifying type is more suitable for continuous measurement over a long period of time. However, in an all-weatherproof measuring apparatus to be used outdoors, the insulating resistance of the electrode supporter will be reduced very often due to the stain of the sensing electrode and rainfall so that no accurate measured value will be obtained in most cases. The present invention is suggested to eliminate such defect in the AC amplifying type apparatuses for measuring the electrostatic field. By "stain" is meant products formed by normal corrosion of the electrode, usually in the form of a salt.

A main object of the present invention is, therefore, to provide an electrostatic field measuring apparatus wherein an insulating supporter for the sensing electrode is provided with a feedback electrode so that surface leakage current flowing into a return through the insulating supporter from the sensing electrode is neutralized by the feedback electrode so that the operation will be stable at all times.

Another object of the present invention is to provide an electrostatic field measuring apparatus which is specifically effective as the all-weather type as used in such severe outdoor conditions as where the apparatus is mounted on aircraft.

A further object of the present invention is to provide an electrostatic field measuring apparatus which will operate reliably on aircraft is designated mounting positions.

Other objects and effects of the present invention will be made clear in the following description detailed with reference to the accompanying drawings, in which.

Figure 1:
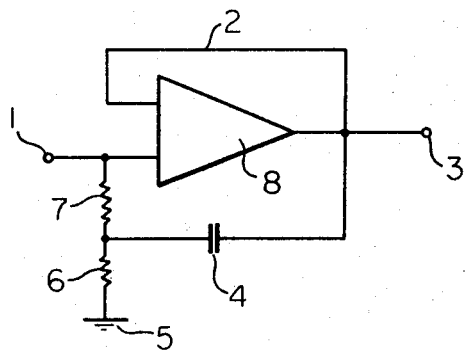
FIG. 1 is a block diagram of a known high input impedance amplifying circuit.

Generally a high input impedance amplifying circuit is formed as shown in FIG. 1. In the drawing, 1 is an input terminal, 2 is a negative feedback line, 3 is an output terminal, 4 is a coupling condenser of a positive feedback circuit, 5 is a common return, 6 is a load resistance, 7 is a positive feedback resistance and 8 is a high impedance operational amplifier. It is well known that the input resistance of such circuit as is shown above is approximately of a value obtained by multiplying the positive feedback resistance 7 by the gain of the amplifier 8.

In the present invention, the insulating resistance of the supporter for the sensing electrode is so formed as to correspond to the resistances 6 and 7 in FIG. 1 and to be thereby improved. The present invention shall be explained with reference to FIG. 2.

Figure 2:
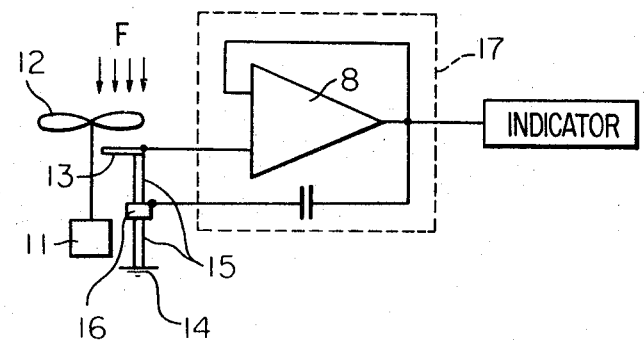
FIG. 2 is a diagram of the electrostatic field measuring apparatus according to the present invention.

In FIG. 2, F is an electrostatic field which gives an electrostatic induction to a sensing electrode 13 cyclically shielded by a rotary sector 12 made of metal in fan shape and driven by a motor 11 and 14 is a return of a circuit, usually a conductive supporting surface. The sensing electrode 13 is supported by the return 14 by an insulating supporter 15 provided with a feedback electrode 16 in an intermediate position so that the leakage current which tends to flow to the return from the sensing electrode will be neutralized. Thus, the circuit formed by the elements 11 through 16 and enclosed by the outline 17 comprises a detector.

If a practical apparatus is so formed that the above mentioned conditions will be satisfied, both of the leakage resistance between the sensing electrode and the feedback electrode and the leakage resistance between the feedback electrode and the return, corresponding to the resistances 6 and 7 in FIG. 1, will be effectively disposed of.

As described above, even if the insulation is reduced by the corrosion products of the sensing electrode and moisture, or a combination of the two, a high input impedance will be maintained by the effect of the feedback electrode, the influence on the measured value will be able to be minimized permitting an accurate, stable measurement regardless of weather.

Figure 3:
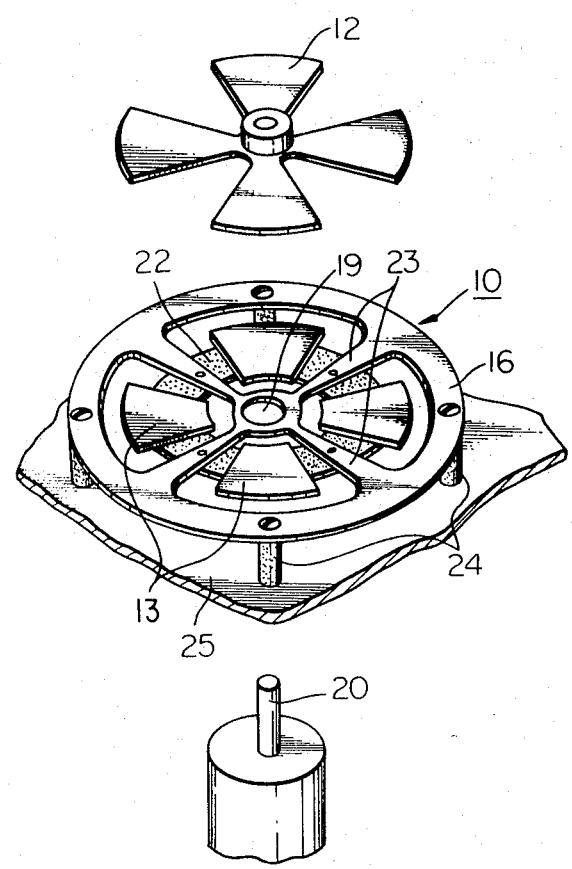
FIG. 3 is a perspective view showing an example of practical arrangement of the electrode according to the present invention.

In FIG. 3, which shows a practical electrode arrangement 10, a sector 12 made of metal, preferably of fan shape, is fixed to a rotary shaft 20 of a motor projecting upward through a central hole 19 in a feedback electrode so as to be rotated by the motor which is preferably mounted upon and inside of the conductive supporting surface. In the illustrated example, the rotary sector and sensing electrode are of 1/8 circle so that the electric force line will be disconnected at 1/8 rotation of the sector. Four sector shaped sensing electrodes 13, electrically connected in parallel to the amplifier input terminal, are spaced at regular intervals upon the upper surface of a ring-shaped insulator 22. The fan shaped member 12, in use, is spaced closely to the sectors 13 and in a plane parallel thereto. The feedback electrode is generally annular in shape. The insulator 22 is supported upon radial spokes or arms 23 formed in an annular feedback electrode 16 which are interspersed between the electrodes 13. A clearance hole 19 is made in the center of the radial arms 23 to clear the motor shaft. The feedback electrode 16 is supported on a return conducting surface in the form of a metal plate 25 by insulating pillars 24 which are effectively in series with the insulator 22. The insulating pillars 24 are made tall so as to prevent water drops from directly bridging the sensing electrodes 13 and the return 25 to form a short circuit. Further, the insulator 22 is entirely separated from the insulating pillars 24 so that there is no direct leakage path from the sensing electrode 13 to the return 25.

According to the above simply-formed electrode arrangement, the influence of rain and snow can be eliminated and the stability of the measurement can be improved.

The features and advantages of the electrostatic field measuring apparatus can be appreciated in applying the present invention to aircraft.

Figure 4:
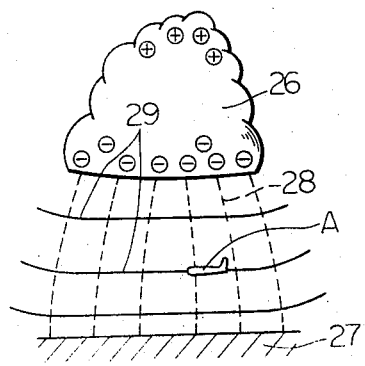
FIG. 4 is a schematic view showing detection of an electrical field.
Figure 5:
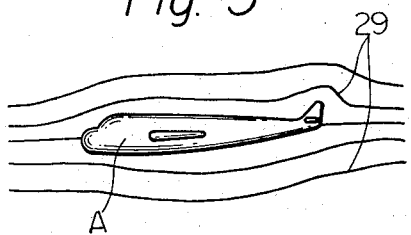
FIG. 5 is a schematic view of a portion of the field.

When such charged thunder cloud 26 is in the sky, an electric field, as shown in FIG. 4, will be present between the cloud and the ground surface. The field includes electric force lines 28, extending between the cloud 26 and the ground surface 27, and equipotential surfaces 29. When an aircraft A is in such an electric field, since the body is a conductor, it will be equipotential on all of its surface with the space in which it is located. More particularly, if the aircraft body A enters a space having parallel equipotential surfaces, it will be enclosed by such equipotential surfaces 29 as shown in FIG. 5.

Figure 6:
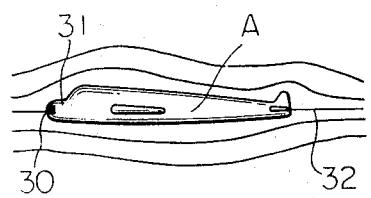
FIG. 6 is a schematic view showing nose-mounting of a detector.

In FIG. 6, for example, when a field detector 30 is fitted to a position 31 at the nose of the aircraft body, and if the detector happens to be at the point of contact of the aircraft body A with the equipotential surface 32, which is equipotential with the aircraft body A, there will be no potential difference across the detector. It will then be impossible to detect a potential, not only because the detector has a limited area but because above and below the equipotential surface 32 as a center, the electric field polarity is reversed and thus self-cancelling.

Figure 7:
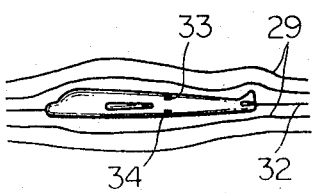
FIG. 7 is a similar view showing another mounting arrangement.

In order to avoid such insensitive state, it is suggested as a means of detecting electric field potentials that two detectors be used respectively above and below the aircraft body with proper treatment of the detected potential outputs. Thus, as shown in FIG. 7, a detector is fitted to each of the upper surface and lower surface of the aircraft body A. In this figure, the aircraft is in parallel with the parallel equipotential surfaces and a relatively high intensity electric field is present above and below the surface 32 with the aircraft body as a center. The detector 33 fitted to the upper part of the aircraft body detects the electric force in the electric field above the potential of the body as a base. That is, if the could bottom in the upper sky is of a negative polarity, the electric field potential will be observed with a value of a negative polarity. On the other hand, as the detector 34 in the lower part of the body is also based on, or referred to, the potential of the aircraft body, the electric field potential will be observed as of a value of a positive polarity as opposed to the induced positive potential on the ground. Thus, if the outputs of the upper and lower detectors are fed into a differential amplifier utilizing the positive and negative polarities of the respective detector outputs, the detection sensitivity will be twice as high as in the case of a single detector and, as a result, an increase of the detection sensitivity will be shown. The differential amplifier may be of a type well known in the art in which two input signals are algebraically summed. The term also includes systems in which each detector has its own amplifier, as in FIG. 2, with the outputs thereof being algebraically summed. Any suitable A-C responsive indicator may be connected to the amplifier output.

Figure 8:
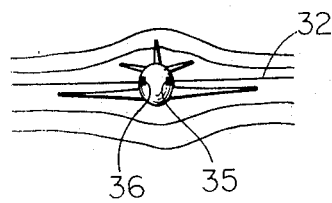

However, when two detectors are horizontally fitted on the right and left of the aircraft body A, as shown in FIG. 8, if they are symmetrical with each other on the right and left, and happen to be set in the center position of the surface 32 equipotential with the aircraft body, as presumable from the explanation of FIG. 6 of the preceding example, neither of the detectors 35, 36 will be able to detect potentials. Further, even if both detectors 35 and 36 are mounted to avoid the position of the equipotential surface 32, the right and left detectors will detect electric field potentials of the same polarity and potential. Accordingly, if the outputs of both detectors are put into a differential amplifier, as in the preceding example, the net output will be zero and, as a result, no signal will be detected. Therefore, the invention contemplates summing the outputs of two detectors, as in FIG. 7, or utilizing the output of one detector facing away from the equipotential surface which intersects the aircraft.

In either of these examples, it is assumed that the aircraft flies in parallel with the equipotential surface 29. Even in case the detectors are set vertically above and below the aircraft body A as in FIG. 7, when the body becomes vertical around it as a rotating axis as in a turning flight, the detectors 33 and 34 will become horizontal and will not be different at all from detectors 35 and 36 set symmetrically with each other on the sides of the body in FIG. 8 and thus the detection will be naturally anticipated to be impossible. That is to say, if the detectors are fitted symmetrically with each other to the aircraft body, the detection will be very likely to be impossible even depending on the flying posture of the aircraft.

In view of the above, the present invention contemplates mounting the detectors so that they produce a useful net output signal regardless of the flying posture of the aircraft.

Figure 9:
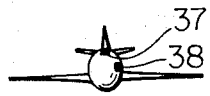
FIGS. 8 and 9 show still other mounting arrangements.
Figure 10:
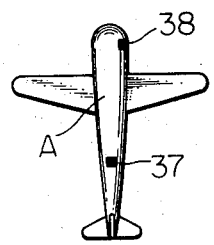
FIG. 10 is a plan view of the embodiment of FIG. 9.

That is, as shown in the embodiment in FIG. 9, if a detector 37 is faced in the vertically upward direction and a detector 38 is faced in the horizontally sidewise direction as seen from the front of the elevation of an aircraft body A and, at the same time, as shown in FIG. 10, as seen from the plan of the body, the detector 38 facing in the horizontally sidewise direction is mounted at the front of the craft and the detector 37 facing in the vertically upward direction is mounted in the rear part of the craft, at least one of detectors 37 and 38 will always produce a useful output signal. Specifically, even if one detector happens to be directed at a surface 32 equipotential with the aircraft body, the other will be prevented from being in exactly the same state. Further, by this arrangement, the orientation sensitive situation described in connection with FIGS. 6, 7 and 8 can be avoided.

Thus, in accordance with the present invention, a plurality of detectors are arranged asymmetrically with one another so that one of them will always detect electric field potentials. Therefore, an electric field potential can be detected by taking the highest one of the detected outputs of the plurality of detectors. It is, of course, technically easy to provide a measure of issuing a warning when an abnormally high potential is detected.

The operation of aircraft increases year after year and many instances of damage by thunderbolts are reported every year. The danger to the lives of persons on aircraft by thunderbolts is so great that it is necessary to detect in advance, and avoid, a thundercloud producing an abnormally high potential by equipping aircraft with electrostatic detectors as in the present invention.

The term "conducting surface" as used herein is not limited to any particular degree of area in view of possible use of the detector in other than an aircraft environment.

While the invention has particular utility on aircraft, it will be understood that it is not limited thereto and is useful in any outdoor environment. Thus the term "conducting surface" as used herein is subject to broad interpretation and not limited to an extensive area. Moreover, the term "corresponding sectors" shall be understood to mean correspondence primarily in number and does not necessarily imply conqruence, indeed the term "sector" where applicable to the shape illustrated in the drawings is not intended to be limited to any particular shape. The term "shielding" as applied to the sensing electrode refers to cyclic disabling of the electrode.

What we claim is:

1. In an electrostatic field measurement apparatus for detecting the intensity of an electric field adjacent a conducting surface, the combination comprising, a sensing electrode spaced from the conducting surface, means for supporting the sensing electrode including first and second insulators and a conductive feedback electrode, said first insulator disposed between the conducting surface and the feedback electrode, said second insulator disposed between the feedback electrode and the sensing electrode, an AC amplifier having an input connection connected to the sensing electrode as well as an output connection and a positive feedback connection, means for cyclically shielding the sensing electrode thereby to produce a fluctuating voltage thereon in the presence of an electric field, the positive feedback connection of the amplifier being connected to the feedback electrode so that said second insulator is included in a positive feedback path for the amplifier thereby to neutralize any tendency toward current leakage on the surface of the insulator from the sensing electrode to the conducting surface.

2. The combination as claimed in claim 1 in which the sensing electrode is in the form of spaced sectors lying in a common plane and connected in parallel with one another and in which the shielding means is in the form of a rotating fan-shaped element having corresponding sectors closely overlying the sectors which form the sensing electrode.

3. In an electrostatic field measurement apparatus for detecting the intensity of an electric field adjacent a conducting surface, the combination comprising, a feedback electrode in the form of a disk having open sectors defined by spaced radial spokes, a sensing electrode in the form of sectors spaced within the open sectors in coplanar relation, means for cyclically shielding the sensing electrode for producing an AC voltage thereon in the presence of an electric field, the shielding means being in the form of a flat rotating fan-shaped member having sectors which correspond to the sectors of the sensing electrode, an insulator interposed between the spokes and the sectors of the sensing element for holding the latter in place, and a further insulator interposed between the feedback electrode and the conducting surface for supporting the feedback electrode, an AC amplifier having an input connection connected to the sensing electrode as well as an output connection and a positive feedback connection, the positive feedback connection of the amplifier being connected to the feedback electrode thereby to neutralize any tendency toward current leakage on the surface of the insulators from the sensing electrode to the conducting surface.

4. In an electrostatic field measurement apparatus for detecting the intensity of an electric field adjacent a conducting surface, the combination comprising, a sensing electrode spaced from the conducting surface and in the form of a circular set of similarly shaped electrodes spaced in coplanar relationship and connected in parallel with one another, means for cyclically shielding the sensing electrode for producing an AC voltage thereon in the presence of an electric field, the shielding means being in the form of a rotor having a similar set of shielding electrodes for alternately exposing and shielding the sensing electrode as the rotor rotates, a feedback electrode arranged parallel to the sensing electrode, insulating means interposed between the feedback electrode and the sensing electrode, and separate insulator means interposed between the feedback electrode and the conducting surface, the shielding means being connected to the conducting surface, an AC amplifier having an input connection connected to the sensing electrode as well as an output connection and a positive feedback connection, the positive feedback connection of the amplifier being connected to the feedback electrode thereby to neutralize any tendency toward current leakage on the surface of the insulators from the sensing electrode to the conducting surface.

5. An electrostatic field measuring apparatus employing a plurality of electrostatic detectors mounted upon an aircraft or the like having a conducting surface, each of the detectors capable of sensing the intensity of the electrostatic field with respect to said conducting surface and being of the type including (1) a sensing electrode spaced from the conducting surface, (2) support means interposed between the conducting surface and the sensing electrode including first and second insulating members connected by an intermediate feedback electrode, (3) means for cyclically shielding the sensing electrode for producing a fluctuating voltage thereon in the presence of an electrostatic field, an AC amplifier means having an input connection connected to the sensing electrodes as well as an output connection and positive feedback connections with the positive feedback connections being connected to the feedback electrodes, and means responsive to the amplifier means for indicating the presence of an electrostatic field, individual ones of the detectors being located at different elevations on the aircraft and facing outwardly therefrom in respective directions.

6. The combination as claimed in claim 5 in which individual ones of the detectors, in addition to being located at different elevations on the aircraft, are located at spaced positions along the length thereof for response of the indicator means to an electrostatic field surrounding the aircraft regardless of the orientation of the aircraft in the field.

7. The combination as claimed in claim 5 in which the amplifier means is of the type capable of responding to the differential signals from the individual detectors.

* * * * *